United States Patent
Herslow et al.

(10) Patent No.: US 10,783,422 B2
(45) Date of Patent: Sep. 22, 2020

(54) CERAMIC-CONTAINING AND CERAMIC COMPOSITE TRANSACTION CARDS

(71) Applicant: COMPOSECURE, LLC, Somerset, NJ (US)

(72) Inventors: John Herslow, Scotch Plains, NJ (US); Adam J. Lowe, Somerset, NJ (US)

(73) Assignee: Composecure, LLC, Somerset, NJ (US)

( * ) Notice: Subject to any disclaimer, the term of this patent is extended or adjusted under 35 U.S.C. 154(b) by 0 days.

(21) Appl. No.: 15/521,519

(22) PCT Filed: Nov. 3, 2015

(86) PCT No.: PCT/US2015/058820
§ 371 (c)(1),
(2) Date: Apr. 24, 2017

(87) PCT Pub. No.: WO2016/073473
PCT Pub. Date: May 12, 2016

(65) Prior Publication Data
US 2017/0316300 A1 Nov. 2, 2017

Related U.S. Application Data

(63) Continuation-in-part of application No. 14/718,596, filed on May 21, 2015.
(Continued)

(51) Int. Cl.
*G06K 19/077* (2006.01)
*G06K 19/07* (2006.01)
(Continued)

(52) U.S. Cl.
CPC .......... *G06K 19/07722* (2013.01); *B32B 3/04* (2013.01); *B32B 3/06* (2013.01);
(Continued)

(58) Field of Classification Search
CPC ..................... G06K 19/07722; G06K 19/0723
See application file for complete search history.

(56) References Cited

U.S. PATENT DOCUMENTS

| | | | |
|---|---|---|---|
| 1,601,287 | A | 9/1926 | Bertinetti |
| 2,123,612 | A | 7/1938 | Obert |

(Continued)

FOREIGN PATENT DOCUMENTS

| | | |
|---|---|---|
| CN | 1172141 A | 2/1998 |
| CN | 1234888 A | 11/1999 |
| CN | 1241969 A | 1/2000 |
| CN | 2521676 Y | 11/2002 |

(Continued)

OTHER PUBLICATIONS

Wikipedia.com "Tetraethyl orthosilicate." Dec. 21, 2018.*
(Continued)

*Primary Examiner* — Thien M Le
*Assistant Examiner* — Asifa Habib
(74) *Attorney, Agent, or Firm* — RatnerPrestia (57) ABSTRACT

A transaction card includes a monolithic ceramic card body having one or more pockets, and at least one of a magnetic stripe, a barcode, and a laser signature portion. The one or more pockets may be configured to receive at least one of the magnetic stripe, the barcode, a contact chip module, a contactless chip module, a dual interface chip module, a booster antenna, a hologram or commercial indicia. A transaction card may also include a substrate layer having a first side and a second side. A first ceramic layer is connected to the first side of the substrate layer.

63 Claims, 9 Drawing Sheets

Related U.S. Application Data (60) Provisional application No. 62/074,305, filed on Nov. 3, 2014.

(51) Int. Cl.

| | | |
|---|---|---|
| B32B 13/04 | (2006.01) | |
| B32B 9/00 | (2006.01) | |
| B32B 21/14 | (2006.01) | |
| B32B 37/12 | (2006.01) | |
| B32B 38/14 | (2006.01) | |
| C25D 11/24 | (2006.01) | |
| B32B 7/12 | (2006.01) | |
| B32B 37/18 | (2006.01) | |
| B32B 9/04 | (2006.01) | |
| B32B 15/04 | (2006.01) | |
| B32B 38/10 | (2006.01) | |
| C25D 5/02 | (2006.01) | |
| C25D 11/34 | (2006.01) | |
| B32B 21/08 | (2006.01) | |
| C25D 11/26 | (2006.01) | |
| B32B 27/08 | (2006.01) | |
| C25D 11/04 | (2006.01) | |
| B32B 15/14 | (2006.01) | |
| B32B 27/12 | (2006.01) | |
| B32B 13/06 | (2006.01) | |
| B32B 15/08 | (2006.01) | |
| C25D 11/18 | (2006.01) | |
| B32B 9/02 | (2006.01) | |
| B32B 21/00 | (2006.01) | |
| B32B 33/00 | (2006.01) | |
| B32B 27/38 | (2006.01) | |
| B32B 13/12 | (2006.01) | |
| B32B 38/00 | (2006.01) | |
| C25D 7/00 | (2006.01) | |
| B32B 3/26 | (2006.01) | |
| B32B 38/06 | (2006.01) | |
| B32B 3/08 | (2006.01) | |
| B32B 3/04 | (2006.01) | |
| B32B 27/30 | (2006.01) | |
| B32B 21/04 | (2006.01) | |
| B32B 27/36 | (2006.01) | |
| G06K 19/02 | (2006.01) | |
| B32B 3/06 | (2006.01) | |
| B32B 15/082 | (2006.01) | |
| B32B 15/20 | (2006.01) | |
| B32B 15/10 | (2006.01) | |
| B32B 3/30 | (2006.01) | |
| B32B 17/00 | (2006.01) | |
| B32B 15/18 | (2006.01) | |
| B32B 15/09 | (2006.01) | |
| B32B 7/08 | (2019.01) | |
| B32B 27/06 | (2006.01) | |
| B32B 18/00 | (2006.01) | |
| B32B 27/18 | (2006.01) | |

(52) U.S. Cl.
CPC ............... *B32B 3/08* (2013.01); *B32B 3/266* (2013.01); *B32B 3/30* (2013.01); *B32B 7/08* (2013.01); *B32B 7/12* (2013.01); *B32B 9/00* (2013.01); *B32B 9/005* (2013.01); *B32B 9/025* (2013.01); *B32B 9/04* (2013.01); *B32B 9/041* (2013.01); *B32B 9/042* (2013.01); *B32B 9/045* (2013.01); *B32B 9/047* (2013.01); *B32B 13/04* (2013.01); *B32B 13/06* (2013.01); *B32B 13/12* (2013.01); *B32B 15/04* (2013.01); *B32B 15/043* (2013.01); *B32B 15/08* (2013.01); *B32B 15/082* (2013.01); *B32B 15/09* (2013.01); *B32B 15/10* (2013.01); *B32B 15/14* (2013.01); *B32B 15/18* (2013.01); *B32B 15/20* (2013.01); *B32B 17/00* (2013.01); *B32B 18/00* (2013.01); *B32B 21/00* (2013.01); *B32B 21/04* (2013.01); *B32B 21/08* (2013.01); *B32B 21/14* (2013.01); *B32B 27/06* (2013.01); *B32B 27/08* (2013.01); *B32B 27/12* (2013.01); *B32B 27/304* (2013.01); *B32B 27/36* (2013.01); *B32B 27/365* (2013.01); *B32B 27/38* (2013.01); *B32B 33/00* (2013.01); *B32B 37/12* (2013.01); *B32B 37/18* (2013.01); *B32B 38/06* (2013.01); *B32B 38/10* (2013.01); *B32B 38/14* (2013.01); *B32B 38/145* (2013.01); *C25D 5/022* (2013.01); *C25D 7/00* (2013.01); *C25D 11/04* (2013.01); *C25D 11/18* (2013.01); *C25D 11/243* (2013.01); *C25D 11/26* (2013.01); *C25D 11/34* (2013.01); *G06K 19/02* (2013.01); *G06K 19/0723* (2013.01); *B32B 27/18* (2013.01); *B32B 38/0012* (2013.01); *B32B 38/105* (2013.01); *B32B 2038/0016* (2013.01); *B32B 2250/02* (2013.01); *B32B 2250/03* (2013.01); *B32B 2250/04* (2013.01); *B32B 2250/40* (2013.01); *B32B 2255/00* (2013.01); *B32B 2255/06* (2013.01); *B32B 2255/08* (2013.01); *B32B 2255/10* (2013.01); *B32B 2255/20* (2013.01); *B32B 2255/205* (2013.01); *B32B 2255/26* (2013.01); *B32B 2255/28* (2013.01); *B32B 2264/108* (2013.01); *B32B 2270/00* (2013.01); *B32B 2307/40* (2013.01); *B32B 2307/402* (2013.01); *B32B 2307/4023* (2013.01); *B32B 2307/4026* (2013.01); *B32B 2307/412* (2013.01); *B32B 2307/58* (2013.01); *B32B 2307/584* (2013.01); *B32B 2307/732* (2013.01); *B32B 2307/75* (2013.01); *B32B 2311/24* (2013.01); *B32B 2313/04* (2013.01); *B32B 2315/02* (2013.01); *B32B 2317/08* (2013.01); *B32B 2317/16* (2013.01); *B32B 2363/00* (2013.01); *B32B 2425/00* (2013.01); *C25D 11/246* (2013.01); *Y10T 29/49004* (2015.01); *Y10T 29/49828* (2015.01); *Y10T 156/10* (2015.01); *Y10T 156/1039* (2015.01); *Y10T 156/1082* (2015.01)

(56) References Cited

U.S. PATENT DOCUMENTS

| | | | |
|---|---|---|---|
| 2,205,466 A | | 6/1940 | Caprio et al. |
| 4,278,377 A | | 7/1981 | Elineau |
| 4,499,126 A | | 2/1985 | Suzuki et al. |
| 4,692,394 A | * | 9/1987 | Drexler ............... G03C 11/02 235/488 |
| 4,711,690 A | | 12/1987 | Haghiri-Tehrani |
| 4,971,646 A | | 11/1990 | Schell et al. |
| 5,045,511 A | * | 9/1991 | Bosomworth ..... B01D 39/2075 210/510.1 |
| 5,173,133 A | | 12/1992 | Morin et al. |
| 5,292,616 A | | 3/1994 | Fujita et al. |
| 5,526,664 A | | 6/1996 | Vetter |
| 5,543,269 A | | 8/1996 | Chatterjee et al. |
| 5,549,953 A | | 8/1996 | Li |
| 5,574,309 A | * | 11/1996 | Papapietro ......... G06K 19/07745 257/679 |
| 5,702,666 A | | 12/1997 | Hatakeyama et al. |
| 5,804,285 A | | 9/1998 | Kobayashi et al. |
| 5,843,599 A | * | 12/1998 | Paz-Pujalt ............. B41M 5/262 430/17 |
| 5,892,661 A | | 4/1999 | Stafford et al. |

(56) References Cited

U.S. PATENT DOCUMENTS

| | | | |
|---|---|---|---|
| 6,158,663 A | 12/2000 | Ochiai | |
| 6,198,155 B1* | 3/2001 | Verhaegh | H01L 23/291 257/565 |
| 6,214,155 B1 | 4/2001 | Leighton | |
| 6,364,983 B1 | 4/2002 | Kay | |
| 6,478,228 B1 | 11/2002 | Ikefuji et al. | |
| 6,581,839 B1 | 6/2003 | Lasch et al. | |
| 6,589,642 B1 | 7/2003 | Miller et al. | |
| 6,607,135 B1 | 8/2003 | Hirai et al. | |
| 6,644,552 B1 | 11/2003 | Herslow | |
| 6,764,005 B2* | 7/2004 | Cooper | G06K 19/06 235/449 |
| 6,853,286 B2 | 2/2005 | Nikawa et al. | |
| 6,857,569 B1 | 2/2005 | Smith, Sr. et al. | |
| 7,022,202 B2 | 4/2006 | Goertzen | |
| 7,029,547 B2 | 4/2006 | Biller | |
| 7,063,924 B2 | 6/2006 | Kaminsky et al. | |
| 7,134,603 B2* | 11/2006 | Batoha | G06K 19/02 235/491 |
| 7,287,704 B2 | 10/2007 | Herslow | |
| D573,182 S | 7/2008 | Ricketts et al. | |
| 7,398,917 B2 | 7/2008 | Aibazov et al. | |
| 7,494,057 B2 | 2/2009 | Lasch et al. | |
| 7,503,503 B2 | 3/2009 | Riedl et al. | |
| 7,530,491 B2 | 5/2009 | Lasch et al. | |
| 7,544,266 B2 | 6/2009 | Herring et al. | |
| 7,588,184 B2 | 9/2009 | Gandel et al. | |
| 7,757,957 B2 | 7/2010 | Cranston et al. | |
| 7,763,179 B2 | 7/2010 | Levy et al. | |
| 7,823,777 B2 | 11/2010 | Varga et al. | |
| D632,735 S | 2/2011 | McGrane et al. | |
| 7,909,258 B2 | 3/2011 | Kim | |
| 8,033,457 B2 | 10/2011 | Varga et al. | |
| 8,087,698 B2 | 1/2012 | Jones et al. | |
| 8,356,757 B2 | 1/2013 | Sonoda et al. | |
| 8,397,998 B1 | 3/2013 | Mann et al. | |
| D687,886 S | 8/2013 | Abrabian | |
| 8,579,201 B2 | 11/2013 | Akesson | |
| 8,672,232 B2 | 3/2014 | Herslow | |
| 8,725,589 B1* | 5/2014 | Skelding | G06Q 20/341 705/26.5 |
| 8,752,277 B2 | 6/2014 | Orihara et al. | |
| 8,944,810 B2 | 2/2015 | Herslow | |
| 9,016,591 B2 | 4/2015 | Herslow et al. | |
| 9,070,053 B2 | 6/2015 | Mostelker | |
| 9,300,251 B2 | 3/2016 | Khitun et al. | |
| 9,327,484 B2 | 5/2016 | Herring et al. | |
| 9,390,363 B1 | 7/2016 | Herslow et al. | |
| 9,390,366 B1 | 7/2016 | Herslow et al. | |
| 9,542,635 B2 | 1/2017 | Herslow | |
| 9,569,718 B2 | 2/2017 | Herslow | |
| 10,399,905 B2* | 9/2019 | Ketcham | G06F 1/1656 |
| 2001/0049004 A1 | 12/2001 | Wilkie | |
| 2002/0007906 A1 | 1/2002 | Droz | |
| 2002/0096569 A1 | 7/2002 | Boutaghou et al. | |
| 2003/0038174 A1 | 2/2003 | Jones | |
| 2003/0065938 A1 | 4/2003 | Kitamura et al. | |
| 2003/0136848 A1 | 7/2003 | Kiekhaefer | |
| 2003/0223616 A1 | 12/2003 | D'Amato et al. | |
| 2004/0031855 A1 | 2/2004 | Takahashi | |
| 2004/0131756 A1 | 7/2004 | Skierski et al. | |
| 2004/0217178 A1 | 11/2004 | Lasch et al. | |
| 2005/0003297 A1* | 1/2005 | Labrec | B41M 3/14 430/270.1 |
| 2005/0040243 A1 | 2/2005 | Bi et al. | |
| 2005/0095408 A1 | 5/2005 | LaBrec et al. | |
| 2005/0242194 A1 | 11/2005 | Jones et al. | |
| 2006/0102729 A1 | 5/2006 | Gandel et al. | |
| 2007/0089831 A1 | 4/2007 | Florentino et al. | |
| 2008/0129037 A1* | 6/2008 | Roth | G06K 17/00 283/85 |
| 2008/0164307 A1 | 7/2008 | Silverstein | |
| 2008/0166482 A1 | 7/2008 | Frye et al. | |
| 2008/0274225 A1 | 11/2008 | Bharadwai et al. | |
| 2008/0296887 A1 | 12/2008 | Baggenstos | |
| 2008/0309064 A1 | 12/2008 | Herlin et al. | |
| 2009/0020523 A1 | 1/2009 | DeMichael et al. | |
| 2009/0032602 A1 | 2/2009 | Nishi et al. | |
| 2009/0169776 A1 | 7/2009 | Herslow | |
| 2009/0179817 A1 | 7/2009 | Yin | |
| 2009/0218401 A1 | 9/2009 | Moran et al. | |
| 2009/0294543 A1* | 12/2009 | Varga | G06K 19/02 235/492 |
| 2009/0314424 A1 | 12/2009 | Herring et al. | |
| 2010/0021740 A1 | 1/2010 | Tanaka et al. | |
| 2010/0059266 A1 | 3/2010 | Yoo et al. | |
| 2010/0068395 A1 | 3/2010 | Moriya et al. | |
| 2010/0116891 A1 | 5/2010 | Yano et al. | |
| 2010/0224959 A1 | 9/2010 | Scherabon et al. | |
| 2010/0276497 A1 | 11/2010 | Seban et al. | |
| 2011/0020606 A1 | 1/2011 | Herslow et al. | |
| 2011/0031319 A1 | 2/2011 | Kiekhaefer et al. | |
| 2011/0101113 A1 | 5/2011 | Konjima et al. | |
| 2011/0226858 A1 | 9/2011 | Lasch et al. | |
| 2011/0309146 A1 | 12/2011 | Zazzu et al. | |
| 2012/0325914 A1 | 12/2012 | Herslow | |
| 2013/0008796 A1 | 1/2013 | Silverman et al. | |
| 2013/0033407 A1 | 2/2013 | Chae et al. | |
| 2013/0067842 A1 | 3/2013 | Meersseman et al. | |
| 2013/0119147 A1 | 5/2013 | Varga et al. | |
| 2013/0126622 A1 | 5/2013 | Finn | |
| 2013/0248607 A1* | 9/2013 | Zlotnik | G06K 19/02 235/488 |
| 2013/0287267 A1 | 10/2013 | Varone | |
| 2014/0144993 A1 | 5/2014 | Seo et al. | |
| 2014/0224881 A1 | 8/2014 | Herslow | |
| 2015/0115039 A1 | 4/2015 | Mosteller | |
| 2015/0136856 A1 | 5/2015 | Herslow et al. | |
| 2015/0180229 A1 | 6/2015 | Herslow | |
| 2015/0206047 A1 | 7/2015 | Herslow et al. | |
| 2015/0298429 A1 | 10/2015 | Ricketts et al. | |
| 2015/0339564 A1 | 11/2015 | Herslow et al. | |
| 2016/0042268 A1* | 2/2016 | Puttkammer | B42D 25/00 235/375 |
| 2016/0110639 A1* | 4/2016 | Finn | G06K 19/07788 235/439 |
| 2016/0180212 A1 | 6/2016 | Herslow et al. | |
| 2016/0229081 A1 | 8/2016 | Williams et al. | |
| 2016/0232438 A1* | 8/2016 | Williams | G06K 19/02 |
| 2017/0017871 A1 | 1/2017 | Finn et al. | |
| 2017/0077589 A1* | 3/2017 | Finn | H01Q 1/2225 |
| 2017/0185885 A1 | 6/2017 | Skelding et al. | |

FOREIGN PATENT DOCUMENTS

| | | |
|---|---|---|
| CN | 102263327 A | 11/2011 |
| DE | 4131617 A1 | 4/1992 |
| EP | 0559115 A1 | 9/1993 |
| JP | 5430908 U | 2/1979 |
| JP | 199663 U | 7/1989 |
| JP | 0615993 A | 1/1994 |
| JP | 07155970 A | 6/1995 |
| JP | 2002189433 A | 7/2002 |
| JP | 2002370457 A | 12/2002 |
| JP | 2004265176 A | 9/2004 |
| JP | 2007128393 A | 5/2007 |
| JP | 2009096027 A | 5/2009 |
| JP | 2011521377 A | 7/2011 |
| KR | 20100066148 A | 6/2010 |
| KR | 20130006358 A | 1/2013 |
| KR | 101699412 B1 | 1/2017 |
| WO | 2004063977 A2 | 7/2004 |
| WO | 2006081385 A1 | 8/2006 |
| WO | 2012121494 A2 | 9/2012 |
| WO | 2015179639 A1 | 11/2015 |
| WO | 2016073473 A1 | 5/2016 |

OTHER PUBLICATIONS

International Preliminary Report on Patentability for International Application No. PCT/US2015/058820, dated May 9, 2017, 8 pages.

(56) References Cited

OTHER PUBLICATIONS

Extended European Search Report for European Application No. 15796355.4, dated Nov. 13, 2017, 8 pages.
International Search Report and Written Opinion of the International Searching Authority for International Application No. PCT/US2015/058820, dated Feb. 19, 2016, 11 pages.
Singapore Written Opinion for Singapore Application No. 11201609690Y, dated Jul. 13, 2017, 8 pages.
International Search Report and Written Opinion of the International Searching Authority for International Application No. PCT/US2015/031971, dated Sep. 30, 2015, 20 pages.
Non Final Office Action for U.S. Appl. No. 14/718,596, dated Aug. 11, 2017, 24 pages.
New Zealand Examination Report for New Zealand Application No. 726408, dated Sep. 25, 2017, 16 pages.
Entire patent prosecution history for U.S. Appl. No. 14/718,596, filed May 21, 2015, entitled "Transaction and ID Cards Having Selected Texture and Coloring".
Entire patent prosecution history for U.S. Appl. No. 15/379,569, filed Dec. 15, 2016, entitled "Transaction and ID Cards Having Selected Texture and Coloring".
Entire patent prosecution history for U.S. Appl. No. 12/460,829, filed Jul. 24, 2009, entitled "Card With Embedded Image".
Entire patent prosecution history for U.S. Appl. No. 14/977,553, filed Dec. 21, 2015, entitled "Smart Metal Card With Radio Frequency (RF) Transmission Capability".
Entire patent prosecution history for U.S. Appl. No. 14/178,436, filed Feb. 12, 2014 entitled "Durable Card".
Entire patent prosecution history for U.S. Appl. No. 15/637,092, filed Jun. 29, 2017, entitled "Durable Card".
Entire patent prosecution history for U.S. Appl. No. 12/006,68, filed Dec. 31, 2007, entitled "Foil Composite Card", now U.S. Pat. No. 9,542,635, dated Jan. 10, 2017.
Entire patent prosecution history for U.S. Appl. No. 14/183,868, filed Feb. 19, 2014, entitled "Foil Composite Card".
Entire patent prosecution history for U.S. Appl. No. 15/355,018, filed Nov. 17, 2016, entitled "Foil Composite Card".
Entire patent prosecution history for U.S. Appl. No. 15/356,586, filed Nov. 19, 2016, entitled "Foil Composite Card".
New Zealand Examination Report dated Mar. 1, 2018 for IP No. 726408.
Australian Examination Report for Australian Application No. 2015264126, dated Jan. 31, 2018, 4 pages.
Written Opinion for Singapore Application No. 11201703216R, dated Jan. 16, 2018, 5 pages.
Final Office Action for U.S. Appl. No. 14/718,596, dated Jan. 30, 2018, 22 pages.
New Zealand Examination Report for New Zealand Application No. 726408, dated Aug. 22, 2018, 4 pages.

European Communication and Extended European Search Report for European Application No. 15856207.4, dated Jun. 6, 2018, 9 pages.
Notice of Reasons for Rejection for Japanese Application No. 2017-543283, dated May 8, 2018 with translation, 7 pages.
European Communication Pursuant to Article 94(3) for European Application No. 15796355.4, dated Aug. 2, 2018, 4 pages.
New Zealand Examination Report for New Zealand Application No. 726408, dated Jul. 20, 2018, 5 pages.
Notice of Reasons for rejection for Japanese Application No. 2017-513610, dated Jul. 10, 2018 with translation, 12 pages.
Columbian Office Action for Columbian Application No. NC2017/0004295, dated Aug. 16, 2018 with English language remarks, 20 pages.
Non Final Office Action for U.S. Appl. No. 14/718,596, dated May 22, 2018, 18 pages.
Non Final Office Action for U.S. Appl. No. 15/379,569, dated May 17, 2018, 46 pages.
Notice of Reasons for Rejection for Japanese Application No. 2019-045862, dated Oct. 15, 2019, with translation, 8 pages.
Non Final Office Action for U.S. Appl. No. 14/718,596, dated Apr. 8, 2019, 29 pages.
European Communicatioon for European Application No. 15856207.4, dated Mar. 25, 2019, 5 pages.
Japanese Decision of Final Rejection for Japanese Application No. 2017-543283, dated Nov. 20, 2018 with translation, 5 pages.
Chinese Office Action for Chinese Application No. 201580026503.9, dated Nov. 23, 2018 with translation, 23 pages.
Columbian Office Action for Columbian Application No. NC2017-0004295, dated Dec. 19, 2018, 19 pages.
Japanese Decision of Final Rejection for Japanese Application No. 2017-513610, dated May 28, 2017 with translation, 9 pages.
Chinese Office Action for Chinese Application No. 201580059209.8, dated Jun. 10, 2019 with translation, 30 pages.
Chinese Office Action for Chinese Application No. 201580026503.9, dated Jun. 21, 2019 with translation, 18 pages. 2019.
Final Office Action for U.S. Appl. No. 15/379,569, dated Feb. 20, 2019, 26 pages.
Notice of Allowance for U.S. Appl. No. 15/379,569, dated Dec. 2, 2019, 33 pages.
Dai Dahuang, "Films and Coatings": Modern Surface Technology, 2008, (English translation and Chinese original), 10 pages.
Chinese Office Action for Chinese Application No. 201580059209.8, dated Feb. 3, 2020 with partial translation, 15 pages.
Non Final Office Action for U.S. Appl. No. 15/861,321, dated Apr. 17, 2020, 50 pages.
Non Final Office Action for U.S. Appl. No. 15/860,286, dated Apr. 16, 2020, 68 pages.
Japanese Notice of Reasons for Rejection for Japanese Application No. 2019-0013489, dated May 12, 2020 with translation, 16 pages.

\* cited by examiner

FIG. 8

CERAMIC-CONTAINING AND CERAMIC COMPOSITE TRANSACTION CARDS

CROSS-REFERENCE TO RELATED APPLICATIONS

This application is the National Stage filing of International Appln. No. PCT/US2015/058820, filed Nov. 3, 2015, which itself claims priority to U.S. Provisional Patent Application No. 62/074,305, filed Nov. 3, 2014, and U.S. patent application Ser. No. 14/718,596, filed May 21, 2015, the disclosures of which are incorporated herein by reference in their entirety for all purposes.

FIELD OF THE INVENTION

This invention relates to the field of transaction cards and, more particularly, transaction cards having at least one layer or coating of ceramic.

BACKGROUND OF THE INVENTION

Conventional transaction cards are made from thermoplastic materials, such as polyvinyl chloride (PVC) and polyethylene terephthalate (PET). These "standard" transaction cards suffer from low durability and are susceptible to degradation and/or destruction due to environmental factors. For example, exposure to sunlight and/or moisture can result in the disruption of the chemical bonds in the plastic, causing the transaction card to warp, crack, and/or fade. Similarly, plastic cards are easily bent or severed. In both cases, a plastic transaction card may become unusable due to this damage.

In the modern transactional card market, it is often desirable to obtain a "premium" feel, look, or tactile feature that may be marketed to an affluent market. These transactional cards may be used as debit cards, credit cards, or pre-paid cards. As part of this premium feel, a card that is heavier than a standard plastic card is often desired, as well as an increased durability of the card body due to the cost of card.

Existing premium transaction cards are typically made entirely or partially from metal. Metal cards demonstrate an enhanced durability as compared to the standard plastic card. However, some metal cards may disadvantageously: 1) require extensive machining; 2) produce electrostatic discharge; and 3) interfere with radio frequency radiation for contactless transactions.

SUMMARY OF THE INVENTION

Various aspects of the invention relate to transaction cards.

One aspect of the invention comprises a transaction card having a monolithic ceramic card body including one or more pockets, and at least one of a magnetic stripe, a barcode, and a laser signature portion.

Another aspect of the invention comprises a transaction card having a substrate layer having a first side and a second side. A first ceramic layer is connected to the first side of the substrate layer.

Yet another aspect of the invention comprises a transaction card having a substrate core layer having a first side and a second side. A first ceramic layer is connected to the first side of the substrate core layer. A second ceramic layer is connected to the second side of the substrate core layer.

Still another aspect of the invention comprises a transaction card having a substrate core layer having a first side and a second side. A first ceramic layer is connected to the first side of the substrate core layer. A second ceramic layer is connected to the second side of the substrate core layer. The first side and the second side of the substrate core layer define pockets on each side of the substrate core layer, and the first ceramic layer and the second ceramic layer are disposed in the pockets.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

Aspects of the invention relate to transaction cards. As used herein, transaction cards, also known as data cards or smart cards, include credit cards, debit cards, check cards, stored-value cards, gift cards, retail cards, or any other transaction card. Both "contact" and "contactless" bi-directional communication data transaction cards are included.

Transaction cards may be provided with either with electrical contacts for effecting direct electrical contact with a card reader, or with an antenna coil for effecting contactless bi-directional communication with a remote card reader. Transaction cards may also be provided with both "contact" and "contactless" platforms, e.g., dual interface cards.

The inventors have recognized that it would be useful to provide a transaction card that provides a premium feel, look, or tactile feature and that avoids the disadvantages associated with some metal-based transaction cards. The inventors have further recognized that, by employing transaction cards comprised entirely of ceramic, having ceramic inserts, or utilizing a ceramic coating, that transaction cards may be obtained in a variety of colors and with a variety of desired features such as, e.g., laser signatures or decorative designs. The inventors have also realized that the use of ceramic materials offers new possibilities to increase card lifespan and to make counterfeiting more challenging. The inventors have recognized that these benefits may be realized in transaction cards created entirely of ceramic, having ceramic inserts, or utilizing a ceramic coating.

Figure 1:
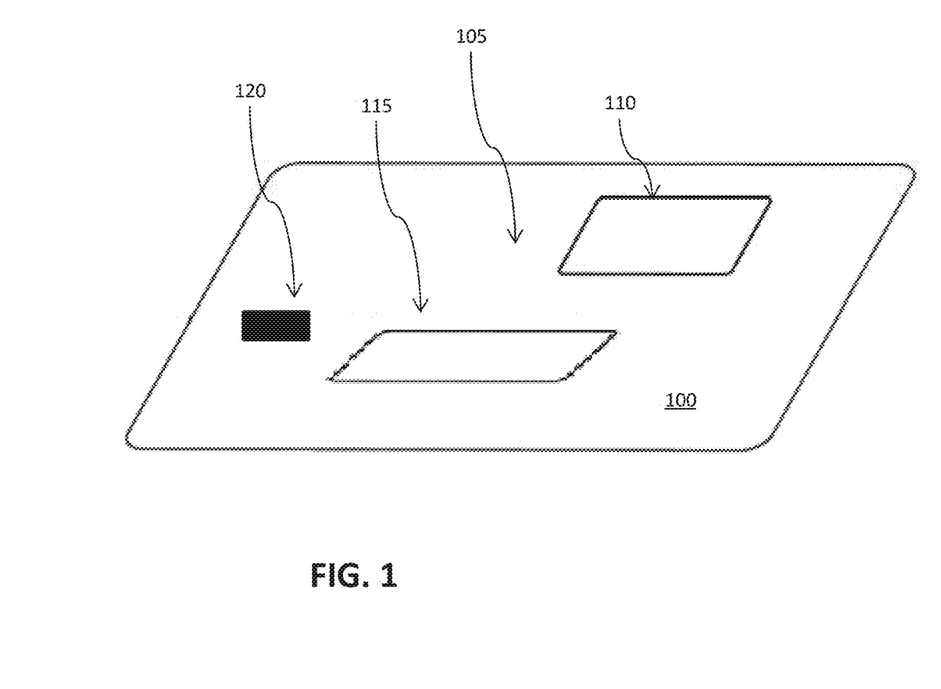
FIG. 1 depicts an exemplary transaction card having a monolithic ceramic body.

FIG. 1 depicts a transaction card 100 having a monolithic ceramic body 105 according to one aspect of the present invention.

Monolithic ceramic body 105 may be manufactured from one or more materials including zirconia, alumina, beryllia, ceria, ceramide, carbide, boride, nitride, and silicide. In one embodiment, monolithic ceramic body 105 is a yttrium-stabilized zirconia. One of ordinary skill in the art will understand that other ceramic materials may be used without departing from the spirit of the invention disclosed herein.

One or more pockets 110 in monolithic ceramic body 105 are configured to receive a variety of components including, e.g., at least one of a magnetic stripe, a barcode, one or more embedded microchips, a hologram, a signature panel, commercial indicia, or any other component typically contained on or within a transaction card. Embedded microchip 120 may comprise a contact chip module, a contactless chip module, a dual interface chip module, or a booster antenna. One or more pockets 110 may also be provided for decorative purposes.

In one embodiment, a magnetic stripe is bonded directly to a polished surface of monolithic ceramic body 105. A variety of adhesives are suitable to perform this bonding including, but not limited to heat-curable vinyl acetate.

Transaction card 100 may further include at least one security feature 120. The security feature 120 may comprise, for example, one or more through holes, windows, microtext, lumiphores, or combination thereof, as well as other such features known in the art. In an exemplary embodiment, all or a portion of monolithic ceramic body 105 is doped with a lumiphore, such as for example inorganic materials including $NaGdF_4$:Yb/Tm, $Y_2SiO_5$:Pr/Li, $Y_2O_3$:Eu, $LaPO_4$:Ce/Tb, and organic/inorganic hybrid materials including quantum dots and CU dots without limitation thereto, such that incident wavelengths of light are quenched, upconverted, or downconverted. In this respect, the inclusion of lumiphores permits the creation of a unique light-based "watermark".

Various colors and textures may be imparted to transaction card 100. Color may be introduced to transaction card 100 by an overcoat or by adding pigments and/or dyes into the ceramic body. In one embodiment, the ceramic material used to fabricate transaction card 100 is substantially optically transparent (e.g., having an optical transparency greater than 70%).

Additional decorative features may be machined or produced using inkjet, drop on demand printing, or laser ablation. In one embodiment, a signature panel 115 is produced by ablating/etching a portion of monolithic ceramic body 105, thereby making that particular area of monolithic ceramic body 105 receptive to ink or dye. A user can then authenticate transaction card 100 by executing a signature directly onto monolithic card body 105. Alternatively, the user's signature can be digitized and then laser engraved onto the monolithic card body 105. By manufacturing signature panel 115 in this manner, cost savings are realized in the elimination of additional components and steps (e.g., a separate polymeric signature panel and the adhesive necessary to hold this separate component in place).

Other functional features (e.g., magnetic stripe, branding, hologram, etc.) and/or decorative designs may be applied directly to the surface of monolithic ceramic body or a pocket may be engraved into monolithic ceramic body 105 via laser or mechanical engraving to receive such features or designs.

Transaction card 100 may be characterized by the nominal dimensions of a standard sized card (e.g., 3.37"×2.125"×0.03"). One of ordinary skill in the art will understand that transaction cards of different dimensions may be made without departing from the scope of the invention disclosed herein.

Figure 2:
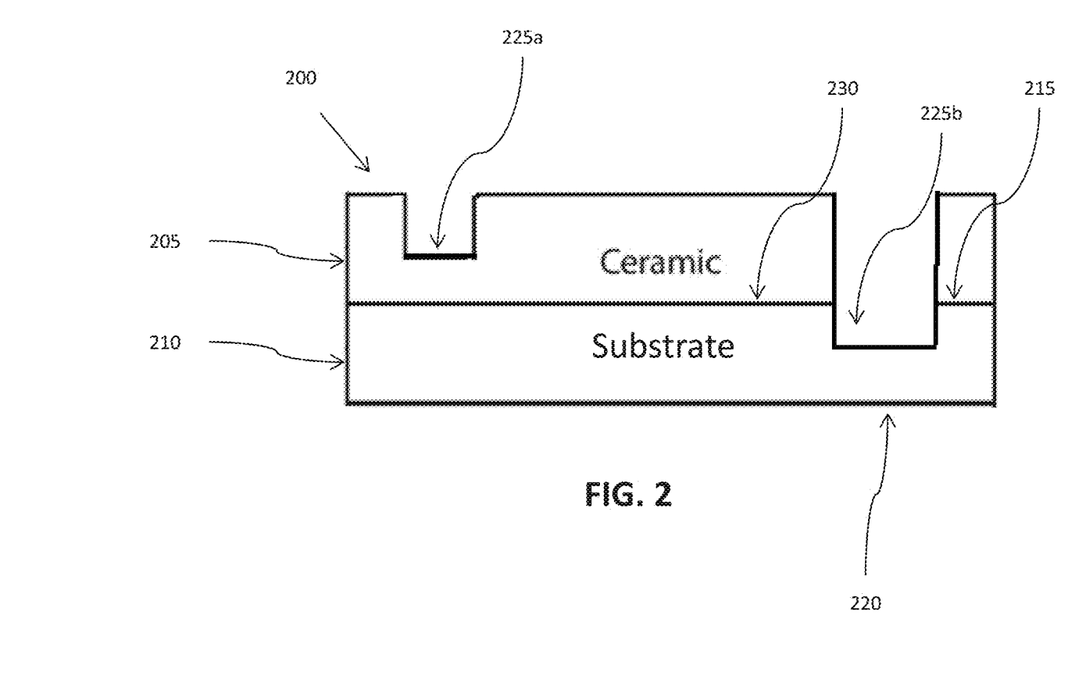
FIG. 2 depicts a cross-sectional diagram of an exemplary transaction card comprising a ceramic layer on a substrate.

Turning to FIG. 2, a cross-sectional diagram of transaction card 200 according to the present invention is shown. In this embodiment, transaction card 200 includes a substrate layer 210 having a first side 215 and a second side 220.

Substrate layer 210 may be any suitable metal, such as stainless steel, bronze, copper, titanium, tungsten carbide, nickel, palladium, silver, gold, platinum, aluminum, or any alloy which gives the card most of its body (structure) and weight. Additionally, or alternatively, substrate layer 210 may be one or a composite of any suitable polymeric (e.g., polycarbonate, polyester, PVC, PETG, PLA, and blends thereof) and inorganic (e.g., glass, ceramic, cellulosic) material. The invention is not limited, however, to any particular substrate material. In one embodiment, substrate layer 210 includes both a layer of metal connected to a second layer of polymeric or inorganic material. In another embodiment, substrate layer 210 includes a plurality of bonded metal layers.

The materials of a composite substrate layer 210 may be selected such that a specific weight is achieved or to display a particular color upon exposure of the ceramic layer(s) to laser marking. The materials may also be selected as a function of cost efficiency or other desirable benefits (e.g., metal/plastic composite cards with single and dual ceramic coatings may achieve desired manufacturing costs, weights, and artistic effects).

Substrate layer 210 may have a thickness ranging of 0.0005" to 0.0325". Where substrate layer 210 is a composite (e.g. multiple layers of metal, multiple layers of metal and another component), the first layer of substrate layer 210 may range from 0.0001" to 0.0315" and the second layer of substrate layer 210 may range from 0.0001" to 0.0315". Other suitable thicknesses for substrate layer 210 are within the scope of the invention and will become apparent upon review of the information and teachings disclosed herein.

First ceramic layer 205 is connected to first side 215 of substrate layer 210. It should be noted that any sort of direct or indirect connection between first ceramic layer 205 and the first side 215 of substrate layer will suffice. For example, the requisite connection could be achieved where first ceramic layer 205 is directly attached to or coated on an intermediary substrate (not shown), which intermediary substrate is adhered substrate layer 210.

First ceramic layer 205 may have, for example, a thickness ranging from about 0.00075" to about 0.003" for sprayed ceramic and about 0.001" to about 0.0032" for solid ceramic, but the invention is not limited to any particular range of thicknesses.

A variety of methods may be used to connect first ceramic layer 205 and substrate layer 210. In one embodiment, first ceramic layer 205 is spray coated to a sufficient thickness onto substrate layer 210. The spray coated layer is then thermally, air, or UV cured.

Figures 3A, 3B:
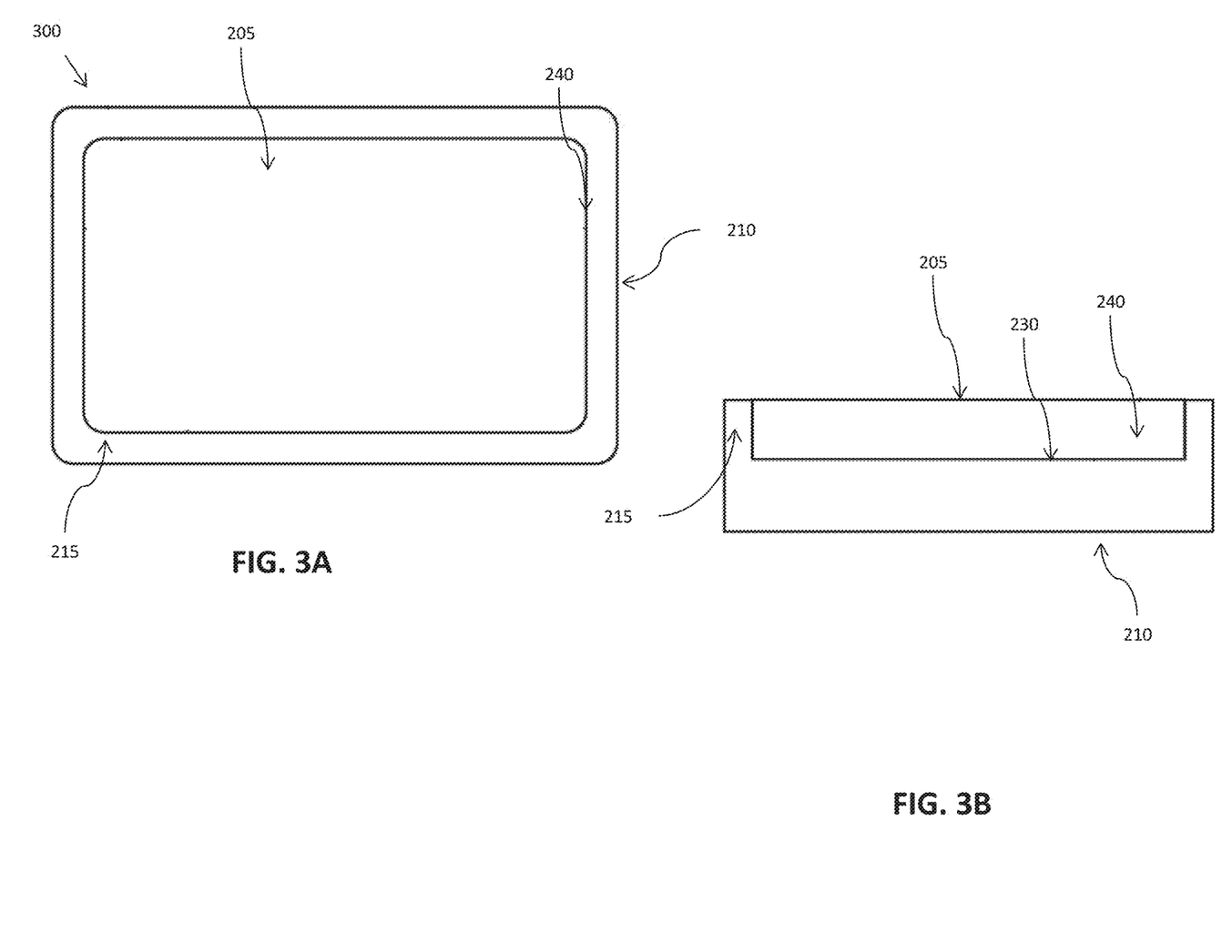
FIG. 3A depicts a plan view of an exemplary transaction card comprising a ceramic layer set into a pocket in a substrate
FIG. 3B depicts a cross-sectional view of the exemplary transaction card of FIG. 3A.

FIGS. 3A and 3B depict an exemplary transaction card 300 deploying another manner of connecting first ceramic layer 205 and substrate layer 210 according to the present invention. In this embodiment, first ceramic layer 205 is an insert set into a pocket 240 (which may be created using, e.g., machining, lasering, milling) in first side 215 of substrate layer 210. An adhesive 230 may be used to adhere first ceramic layer 205 and substrate layer 210. Suitable adhesives may include epoxies, cyanoacrylate, acid modified polyolefin, silicone elastomers, and other naturally occurring adhesives, but the invention is not limited to any particular type of adhesive.

In another embodiment, first ceramic layer 205 is press-fit into pocket 240 in substrate layer 210. Press-fitting is intended to refer to any suitable means by which the ceramic insert is geometrically secured into pocket 240 in substrate layer 210. For example, one method of press-fitting includes "dove tailing" (not shown), in which one or more shapes in the edge of first ceramic layer 205 interlock with mating shapes in the inner edge of substrate layer 210. For example, a male feature in first ceramic layer may fit into a female receptor in the substrate, the ceramic layer may have a female receptor sized to receive a male feature in the substrate, or a combination thereof.

Figure 3C:
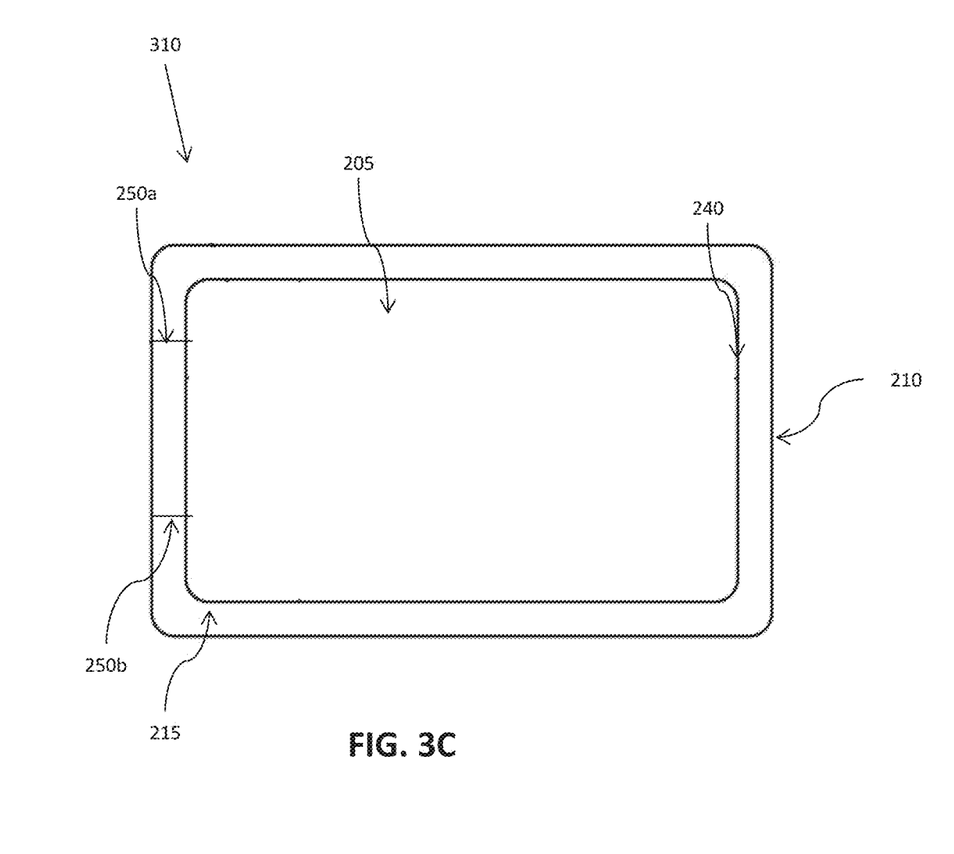
FIG. 3C depicts a plan view of an exemplary transaction card comprising a ceramic layer mounted inside a frame formed by the substrate layer.

Turning to FIG. 3C, still another embodiment for connecting first ceramic layer 205 to substrate layer 210 is depicted with respect to exemplary transaction card 310. In this embodiment, substrate layer 210 includes one or more tapped holes 250a,b such that substrate layer 210 acts as a frame, in which set screws disposed in the tapped holes hold first ceramic layer 205 within pocket 240. One of ordinary skill in the art will, upon reading this disclosure, appreciate the existence of other suitable methods for connecting first ceramic layer 205 and substrate layer 210 that fall within the scope of the present invention.

Turning back to FIG. 2, one or more pockets 225a,b in transaction card 200 are configured to receive one or more of the components described above, e.g., at least one of a magnetic stripe, one or more embedded microchips, a hologram, a signature panel, commercial indicia, or any other component typically contained on or within a transaction card. As depicted, one or more pockets 225a,b may extend for a portion or the entirety of the cross-sectional length of first ceramic layer 205 (225a) and/or, in some embodiments, into substrate layer 210 (225b). In some embodiments, one or more pockets 225a,b extend through the entirety of the cross-sectional length of the first ceramic layer 205, so that the desired components can bond directly to the substrate layer 210 (which can be, e.g., a metal layer).

In other embodiments, one or more pockets 225a,b may extend into substrate layer 210 without breaching the surface of first ceramic layer 205 (e.g., to contain a hidden component such as a booster antenna).

In still other embodiments, one or more pockets may also be produced in substrate layer 210 that ultimately result in depressions in the ceramic coating into which later components may be set to produce a smooth surface in transaction card 200.

For example, in an embodiment in which first ceramic layer 205 is spray coated onto substrate layer 210, one or more pockets 225a,b may be created by providing one or more pockets 225a,b in substrate layer 210 prior to spray-coating. However, it is not necessary to first create pockets in substrate layer 210; one or more pockets may be produced alternatively after spray-coating. Any suitable process may be used to create the one or more pockets 225a,b in substrate layer 210 such as, e.g., mechanical engraving, chemical laser etching, milling, etc.

In one embodiment, first ceramic layer 205 is a sprayed ceramic layer applied to substrate layer 210, which is a polycarbonate sheet. The polycarbonate sheet may be laminated to a desired thickness, bead blasted, sprayed with ceramic to create first ceramic layer 205, and then cured. Individual transaction cards 200 may be produced through punching, lasering, machining, or any other method known in the art.

As described above, various colors and textures may be imparted to transaction card 100. Color may be introduced to transaction card 200 by an overcoat or by adding pigments and/or dyes into the ceramic body. In one embodiment, the ceramic material used to fabricate transaction card 200 is substantially optically transparent, revealing the color and appearance of underlying substrate layer 210.

Figure 4A:
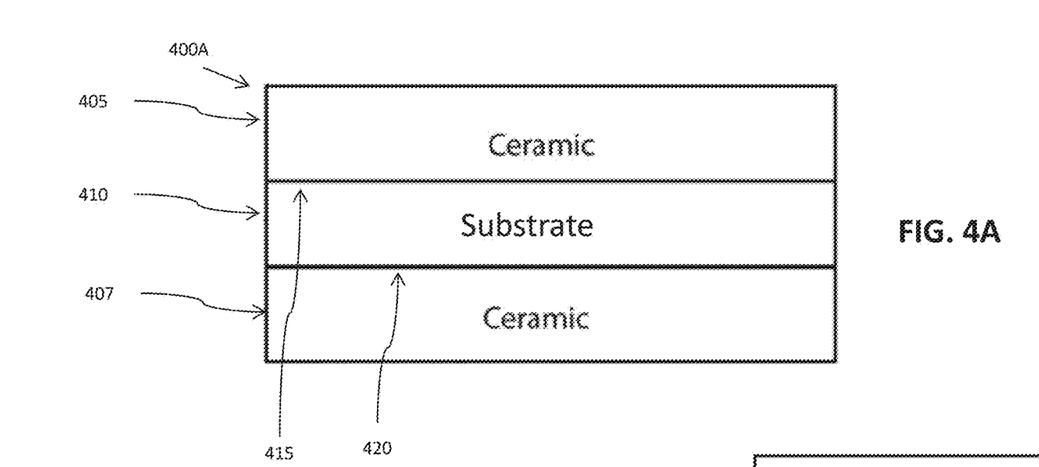
FIG. 4A depicts a cross-sectional view of an exemplary transaction card construction comprising a substrate layer, a first ceramic layer and a second ceramic layer.
Figure 4B:
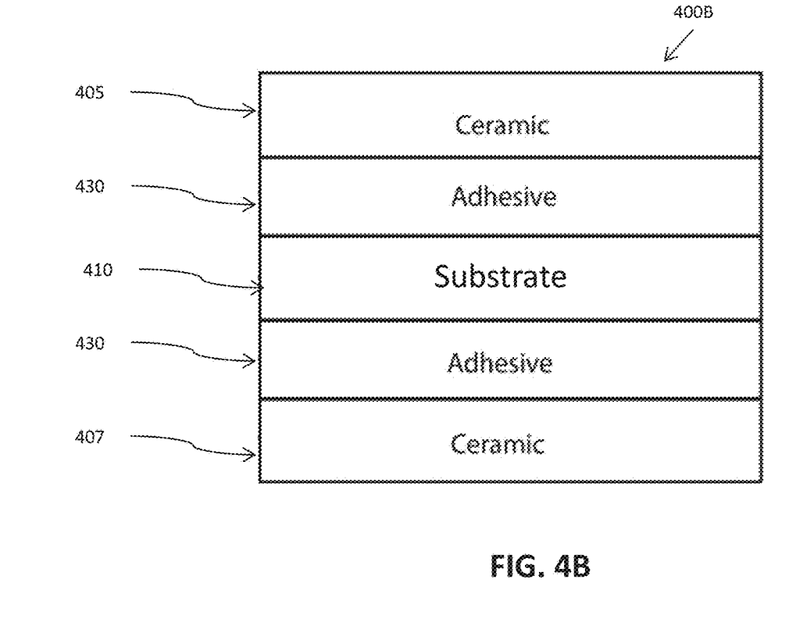
FIG. 4B depicts a cross-sectional view of another exemplary transaction card construction comprising a substrate layer, a first ceramic layer and a second ceramic layer.

FIGS. 4A and 4B depict cross-sectional diagrams of exemplary transaction cards 400A and 400B respectively, according to exemplary embodiments of the present invention. In these embodiments, transaction card 400A includes a substrate layer 410 having a first side 415 and a second side 420.

First ceramic layer 405 is connected to first side 415 of substrate layer 410.

Second ceramic layer 407 is connected to second side 420 of substrate layer 410. As described above, any sort of direct or indirect connection between first ceramic layer 405, second ceramic layer 407, and the respective sides of substrate layer 410 (including through intermediary layers) will suffice.

Any of the connection methods, or combination of these methods, described above (e.g., coating on, press-fitting in, or adhering to the substrate layer) may be used to connect first ceramic layer 405 and second ceramic layer 407 with substrate layer 410. For example, first ceramic layer 405 may be spray coated on first side 415 of substrate layer 410, while second ceramic layer 407 may be press-fit into a pocket defined in the second side 420 of substrate layer 410. As another example, shown in FIG. 4B, first ceramic layer 405 may be adhered to first side 415 of substrate layer 410 and second ceramic layer 407 may be adhered to the second side 420 of substrate layer 410 by adhesive layers 430.

Figure 5:
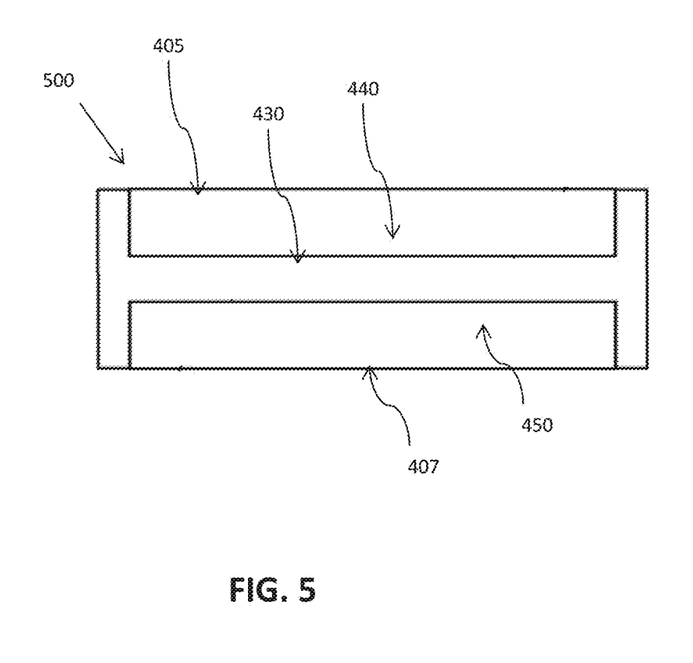
FIG. 5 depicts a cross-sectional view of yet another exemplary transaction card construction comprising a substrate layer, a first ceramic layer and a second ceramic layer.

Similar to the card depicted in FIG. 3B, FIG. 5 depicts a card 500 comprising a first ceramic layer 405 and second ceramic layer 407, which are inserts set into pockets 440 and 450 (which may be created using, e.g., machining, lasering, milling) in substrate layer 410. As above, the ceramic layers may be press-fit, or an adhesive, such as but not limited to epoxies, cyanoacrylate, acid modified polyolefin, silicone elastomers, and other naturally occurring adhesives, may be used to adhere, the ceramic layers into pockets 440 and 450.

Figure 6:
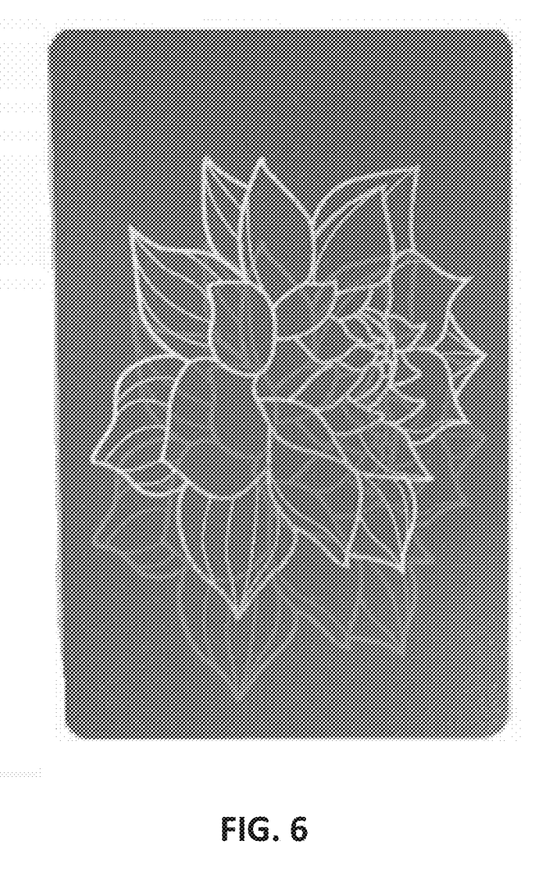
FIG. 6 depicts a plan view image of an exemplary ceramic card having a flower design thereon.
Figure 7:
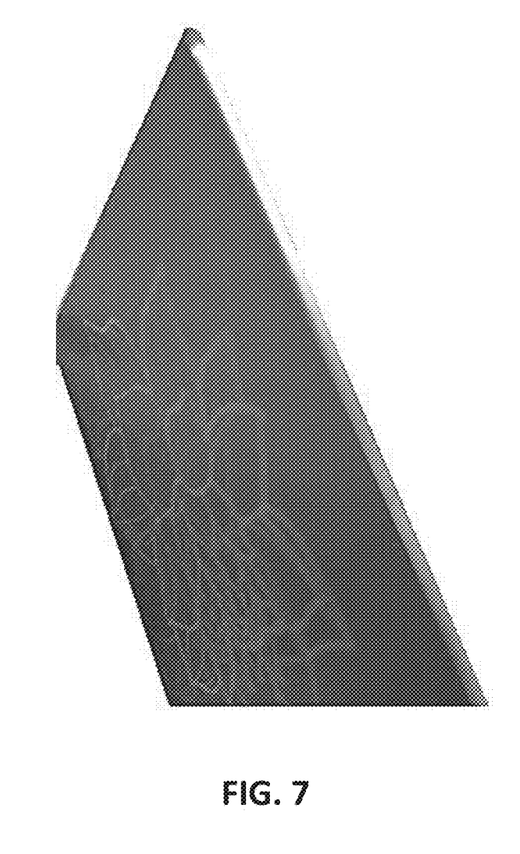
FIG. 7 depicts an edge view of the exemplary card of FIG. 6.

In one exemplary embodiment, 0.02" thick metal core (such as steel) may be bonded to a 0.007" thick PVC layer on one side with a ceramic coating on the un-bonded surface of the metal core. The ceramic may be applied as a spray coating, which is then cured. After curing, the coating may range from, e.g., 0.001" to 0.003" thick, depending on the desired look and texture of the coating. The coatings may, as described above, be produced in a variety of colors. The coating may be comprised of ceramic microparticles and a curable resin binder suspended in a carrier solution. Exemplary ceramic microparticle or nanoparticle materials may include one or more of the following: zirconia dioxide, aluminum disilicide, aluminum cerium oxide, aluminum oxide, aluminum titanate, antimony(III) oxide, antimony tin oxide, barium ferrite, barium strontium titanium oxide, barium titanate(IV), barium zirconate, bismuth cobalt zinc oxide $(Bi_2O_3)_{0.07}(CoO)_{0.03}(ZnO)_{0.90}$ bismuth(III) oxide, boron nitride, calcium oxide, calcium phosphate, calcium titanate, calcium zirconate, cerium iron oxide hydroxide aqueous nanoparticle dispersion, cerium(IV) oxide, cerium (IV)-zirconium(IV) oxide, chromium(III) oxide, cobalt aluminum oxide, cobalt(II,III) oxide, copper iron oxide, copper zinc iron oxide, dysprosium(III) oxide, erbium(III) oxide, europium(III) oxide, titania, silica, ceria, alumina, iron oxide, vanadia, zinc oxide, tin oxide, nickel oxide, and combinations thereof, but the invention is not limited to any particular ceramic materials. Commercial examples of polyceramic coatings containing both polymeric and ceramic components include those sold in connection with the trade names CERAKOTE by NIC Industries, Inc., Ceraset™ by KiON International, and DuraCoat, DuraBake, DuraHeat, by Dura Coat Products, Inc. the manufacturer's specifications for which are hereby incorporated by reference. Once sprayed and cured, the coating provides a unique color and texture to the cards along with a durable finish, typically reaching several thousand Taber abrader cycles. The ceramic coating may be modified with mechanical or chemical engraving, inkjet printing, laser marking and other methods known in the art to provide a desired artistic effect. One example of such an effect is depicted in FIGS. 6 and 7, which depict a card having a flower design, such as may be produced via laser marking.

The ceramic portions of the transaction cards disclosed herein may be manufactured using, e.g., injection molding to achieve a desired shaped, followed by sintering/firing of the molded unit. One or more pockets (FIG. 1, element 110) may be created during the injection molding process.

Additionally, instead of injection molding, the ceramic portions of the transaction cards disclosed herein may be stamped or tape cast prior to firing. One of ordinary skill in the art will understand that additional methods may be used to manufacture transaction cards according to the present invention. For example, such cards may be created from larger blocks of ceramic and be machined to a desired size using an endmill, laser, waterjet, 3D printing, or any other means known in the art.

Figure 8:
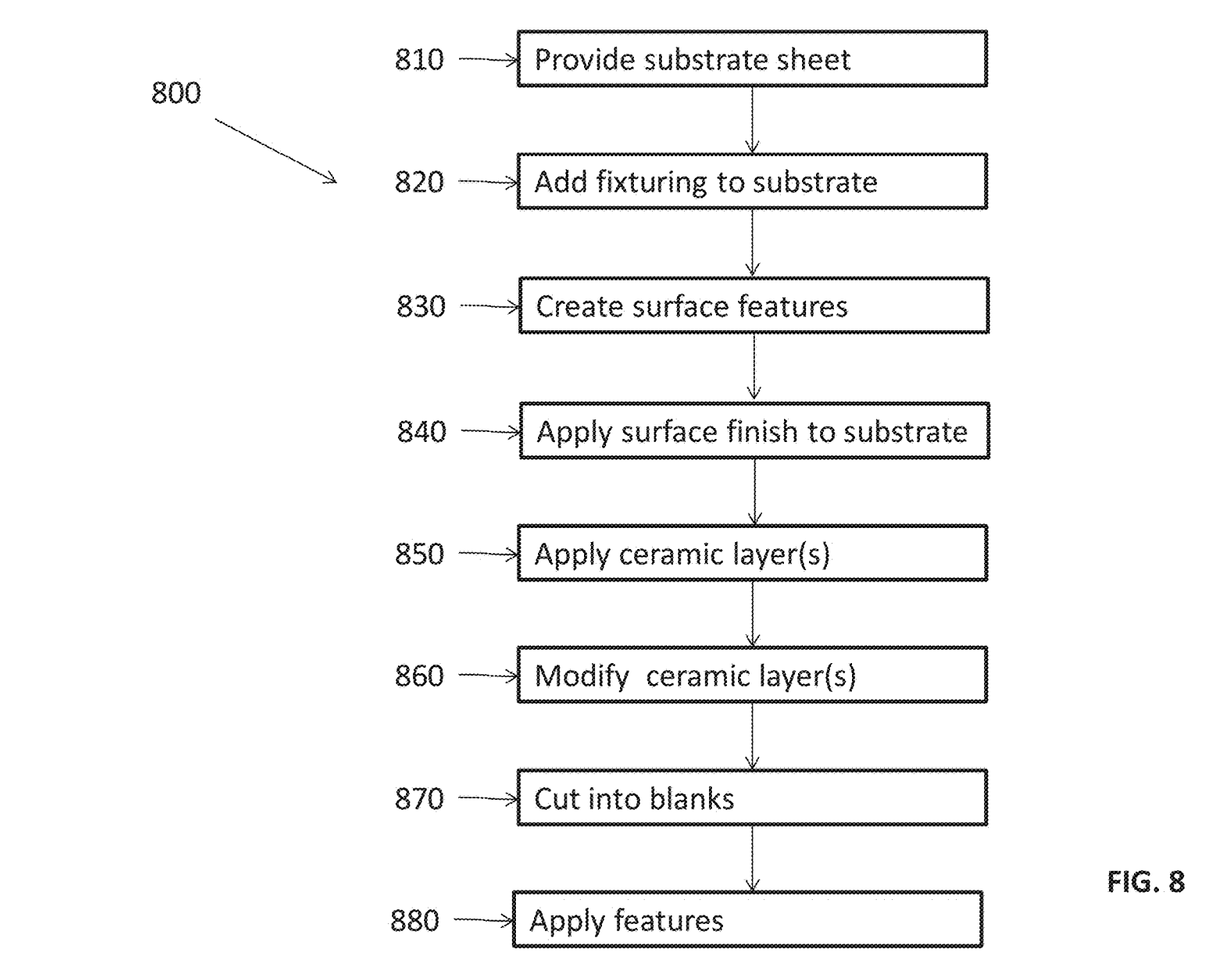
FIG. 8 is a flowchart of showing exemplary steps of an exemplary process for manufacturing an exemplary ceramic card embodiment.

Turning to FIG. 8, a flow diagram depicting selected steps of a process 800 for manufacturing a transaction card according to aspects of the present invention is shown. It should be noted that, with respect to the methods described herein, it will be understood from the description herein that one or more steps may be omitted and/or performed out of the described sequence of the method (including simultaneously) while still achieving the desired result.

In step 810, a substrate layer, e.g., a metal core sheet, is provided. Optionally, this step may include laminating a suitable metal foil, such as an aluminum foil, to one or more surfaces of an inner sub-core (which may be, e.g., metal, polymeric, or inorganic).

In step 820, fixtures are added to the substrate layer to hold the layer in place while subsequent steps are performed.

In step 830, one or more pockets are provided in the substrate layer for receiving functional or decorative features. For example, a pocket may be defined to receive a booster antenna for use in connection with an RFID chip, which can be disposed below the ceramic layer. Pockets may also be produced in the substrate layer that ultimately result in depressions in the ceramic coating into which later components (such as the RFID chip) can be attached at the end of processing, to provide for a smooth surface in the final product.

In step 840, the substrate layer receives a surface finish. Surface finishing can include any method suitable for the particle materials of the substrate layer such as, e.g., bead blasting, tumbling, brushing, etc.

In step 850, one or more ceramic layers and/or coatings are applied to the substrate layer through, e.g., spray coating. The one or more ceramic layers/coatings may also be connected, as described above, through defining pocket(s) in the side(s) of the substrate layer and press-fitting or adhering ceramic insert(s) into the pocket(s).

In step 860, the ceramic layer(s)/coatings are laser marked with designs or other surface features. Additional mechanical, chemical, or laser modifications needed to facilitate later attachment of other features or design components is also performed. For example, edges of any pockets or depressions may be processed for a better fit of features to be added in a subsequent step or areas where an adhesive is later applied may be roughened for better adhesion.

In step 870, the composite sheet is cut into card blanks using, e.g., a CNC (computer numerical control) machine.

In step 880, functional and security features are applied to the individual card blanks. As noted above, such features may fit in a pocket created earlier in the process or adhesively attached to an area that has been roughened. In one embodiment, the magnetic stripe is applied directly on the ceramic layer. This desirably optimizes the planar and flat characteristics of the transaction card surface Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A transaction card comprising:
    a metal substrate layer having a first side and a second side; and
    a first ceramic layer disposed on the first side of the metal substrate layer, the first ceramic layer comprising a cured, spray coating comprising ceramic particles disposed in a resin binder.

2. The transaction card of claim 1, wherein the at least one laser marked feature comprises a security feature, a laser-applied digitized signature, at least one roughened surface, or a combination thereof.

3. The transaction card of claim 1, further comprising one or more luminophores in the ceramic layer.

4. The transaction card of claim 3, wherein the one or more luminophores comprise phosphors operable to shift incident light upfield or downfield.

5. The transaction card of claim 3, wherein the luminophores are disposed in a unique pattern that defines an identification mark.

6. The transaction card of claim 1, wherein the ceramic card body further comprises at least one roughened surface portion.

7. The transaction card of claim 6, wherein the roughened surface portion comprises at least one feature adhesively connected thereto.

8. The transaction card of claim 1, further comprising a magnetic stripe disposed on a non-roughened surface of the card.

9. The transaction card of claim 1, further comprising one or more component pockets in at least the first ceramic layer.

10. The transaction card of claim 1, further comprising a second ceramic layer.

11. The transaction card of claim 10, wherein the second ceramic layer is connected to the second side of the substrate layer.

12. The transaction card of claim 11, wherein the card further comprises one or more non-ceramic, non-metal layers.

13. The transaction card of claim 12, wherein the plastic comprises PVC bonded to a second side of the substrate layer.

14. The card of claim 11, wherein first ceramic layer has at least one attribute that is not present in the second ceramic layer.

15. The card of claim 14, wherein one of the first and second ceramic layers resides in a pocket in the metal substrate and the other of the first and second ceramic layers does not reside in a pocket.

16. The card of 14, wherein the first ceramic layer is one of spray coated on, adhesively bonded to, or press fit relative to the first side of the metal substrate, and the second ceramic layer is a different one of spray coated on, adhesively bonded to, or press fit relative to the second side of the metal substrate.

17. The transaction card of claim 1, wherein the substrate layer comprises a metal selected from the group consisting of: brass, steel, nickel, palladium, silver, gold, platinum, aluminum, and alloys and composites thereof.

18. The transaction card of claim 17, wherein the non-ceramic, non-metal layer comprises plastic.

19. The transaction card of claim 1, further comprising contact or DI chip module disposed in the card, wherein the contact or DI chip module has an exposed outer surface smoothly aligned with an exposed outer surface of the first ceramic layer.

20. The transaction card of claim 1, wherein the transaction card is a dual interface card comprising a DI module, further comprising an antenna configured for use in connection with the DI module.

21. The transaction card of claim 1, wherein the at least one laser-marked feature comprises a design comprising at least two tones of color different than the color of the ceramic layer.

22. The transaction card of claim 1, wherein the first ceramic layer comprises a 3D printed layer.

23. The transaction card of claim 1, wherein the different color of the laser-marked feature comprises a visible portion of a layer underlying the first substrate layer.

24. The transaction card of claim 23, wherein the visible portion comprises a portion of the metal substrate.

25. The transaction card of claim 24, wherein metal substrate comprises a composite construction having a plurality of layers, and the visible portion comprises one of the plurality of layers.

26. The transaction card of claim 1, wherein the ceramic coating has a finish durable to several thousand Taber abrasion cycles.

27. The transaction card of claim 1, wherein the laser-marked feature is a permanent marking.

28. The transaction card of claim 27, wherein the laser-marked feature comprises a laser engraved feature.

29. The transaction card of claim 27, wherein the laser engraved feature comprises surface roughening.

30. The transaction card of claim 27, wherein the laser engraved feature comprises a pocket.

31. The transaction card of claim 1, comprising an engraved feature that reveals a visible portion of a layer underlying the first ceramic layer.

32. The transaction card of claim 31, wherein the engraved feature reveals the metal substrate.

33. The transaction card of claim 1, further comprising phosphors in the ceramic layer operative to shift incident light upfield or downfield to create an identifying image.

34. The transaction card of claim 33, wherein the phosphors define a watermark.

35. The card of claim 1, wherein the first ceramic layer further comprises:
a pigment that imparts a color to the first ceramic layer; and
at least one laser-marked feature having a different color than the color of the first ceramic layer.

36. A transaction card comprising:
a metal substrate layer having a first side and a second side; and
a first ceramic layer disposed on the first side of the substrate layer,
wherein the first side of the substrate layer defines a pocket in the substrate layer, and wherein the first ceramic layer is disposed in the pocket.

37. A transaction card comprising:
a metal substrate layer having a first side and a second side;
a ceramic layer disposed on the first side of the metal substrate layer, the first ceramic layer comprising a cured, spray coating comprising ceramic particles disposed in a resin binder;
a pocket defined in the substrate layer and the ceramic layer; and
a contact or DI chip module disposed in the pocket.

38. The transaction card of claim 37, wherein the ceramic layer comprises zirconia dioxide, aluminum disilicide, and a resin binder.

39. The transaction card of claim 37, the card having a dual interface module, the card further comprising:
one or more non-ceramic, non-metal layers,
a booster antenna configured for use in connection with the DI chip module; and
one or more of a magnetic stripe, a signature panel, a branding design, or a hologram.

40. The transaction card of claim 39, wherein the non-ceramic, non-metal layer comprises plastic.

41. The transaction card of claim 40, wherein the plastic comprises PVC bonded to a second side of the substrate layer.

42. The transaction card of claim 37, the ceramic layer further having at least one laser marked feature, wherein the at least one laser-marked feature comprises at least two color tones that are different than the color of the ceramic layer.

43. A process of making the transaction card of claim 37, the method comprising:

(a) providing the metal substrate layer;
(b) spray coating and curing the ceramic layer on the first side of the substrate layer;
(c) creating the pocket in the substrate layer and the ceramic layer; and
(d) disposing the contact or DI chip module in the pocket such that an exposed outer surface of the contact or DI chip module is smoothly aligned with an exposed outer surface of the ceramic layer.

44. The process of claim 43, wherein spray coating the ceramic layer comprises applying a spray coating mixture comprising zirconia dioxide, aluminum disilicide, the pigment, and the binder suspended in a volatile organic carrier solution.

45. The process of claim 43, comprising thermally curing the ceramic layer.

46. The process of claim 43, comprising air-curing the ceramic layer.

47. The process of claim 43, comprising UV curing the ceramic layer.

48. The process of claim 43, further comprising providing at least one non-metal, non-ceramic layer underlying the second side of the metal substrate.

49. The process of claim 43, further comprising applying a surface finish to at least the metal substrate first side prior to applying the ceramic coating.

50. The process of claim 43, further comprising creating the pocket in the metal substrate prior to applying the ceramic coating.

51. The process of claim 43, comprising conducting at least steps (a)-(d) on a sheet comprising a plurality of cards, and then cutting the sheet into a plurality of card blanks.

52. The process of claim 51, further comprising providing one or more functional or security features to each of the plurality of card blanks in addition to the contact or DI chip module.

53. The process of claim 52, wherein the one or more functional or security features comprises a magnetic stripe, signature panel, or a hologram.

54. The process of claim 43, further comprising including phosphors in the ceramic layer operative to shift incident light upfield or downfield to create an identifying image.

55. The process of claim 54, wherein the phosphors define a watermark.

56. The process of claim 43, further comprising a step of laser-marking at least one feature on the ceramic layer or performing a chemical or mechanical engraving step to reveal a visible portion of a layer underlying the first ceramic layer.

57. The process of claim 56, further comprising providing a layer underneath the first ceramic layer having a desired color revealed in the visible portion.

58. The process of claim 56, wherein revealing the visible portion of a layer underlying the first ceramic layer comprises revealing the metal substrate layer.

59. The process of claim 58, further comprising providing a composite metal substrate underneath the first ceramic layer, the composite metal substrate comprising a first metal layer and a second metal layer, wherein revealing the visible portion comprises revealing a desired layer of the composite metal substrate.

60. The process of claim 43, further comprising a step of laser-marking, performing a chemical or mechanical engraving step, another modifying step, or a combination thereof, to create a design on or in the ceramic layer comprising at least two tones of color different than the color of the ceramic layer.

61. The process of claim 60, wherein the at least two tones of color comprise visible portions of two different metals.

62. The process of claim 61, further comprising selecting a composite metal substrate to provide the at least two tones of color.

63. The process of claim 43, further comprising creating one or more surface features on the metal substrate layer prior to spray coating the ceramic layer, wherein the one or more surface features result in depressions in the ceramic coating.

* * * * *